March 24, 1964  C. H. STEVENS, JR  3,126,443
CABLE SPLICE ASSEMBLY
Original Filed Oct. 11, 1954

INVENTOR.
Charles H. Stevens, Jr.
BY
Shoemaker + Mattare
ATTYS

United States Patent Office 3,126,443
Patented Mar. 24, 1964

3,126,443
CABLE SPLICE ASSEMBLY
Charles H. Stevens, Jr., Cornwall Bridge, Conn., assignor to Empire Products Inc., Cincinnati, Ohio, a corporation of Ohio
Continuation of application Ser. No. 722,518, Mar. 19, 1958, which is a division of application Ser. No. 461,505, Oct. 11, 1954. This application Aug. 18, 1960, Ser. No. 52,005
2 Claims. (Cl. 174—84)

The present invention relates to a new and novel cable splice assembly and method of making same, wherein a fluid-tight connection is provided between adjacent ends of a pair of cables.

The present application is a continuation of U.S. application Serial No. 722,518, filed March 19, 1958, now abandoned, which in turn is a division of U.S. patent application Serial No. 461,505 filed October 11, 1954, now abandoned.

In many industrial applications, portable electric equipment is utilized which requires the use of varying lengths of heavy electric cable to conduct the electricity from a power source to the equipment. Such cables are often damaged thereby necessitating removal of a portion thereof, or it may be desirable to lengthen a cable in some particular cases. It is accordingly desirable to splice different lengths of cable together in the vicinity of the activity where the electric equipment is being employed, and the manner in which such splices are effected should be quite simple such that little equipment is required, and furthermore, the time required to make the splice should be reduced to a minimum.

Heavy duty electrical cables of this type are provided with protective insulation as a safety precaution since such cables usually carry heavy current loads. When a break occurs in the insulation covering of the cables, it is necessary to repair the cable by removing the faulty insulation and splicing the ends of the cable together. It is important when splices are made, either in repairing a cable or when securing two lengths of cable to one another, that a fluid-tight seal be provided by the splice in order to prevent possible electrical leakage from the splice which would endanger a person handling the cable, and further to protect the cable from moisture which might enter the seal and cause corrosion of the cable ends thereby shortening the life of the cable.

The present invention provides an extremely simple structure and method wherein the bared ends of a pair of cables are inserted in opposite ends of a deformable tubular connector member, and the ends of the connector member are crimped upon the bared ends of the cables thereby securely connecting the cable ends both physically and electrically. An insulating means in the form of a sheath of dielectric material is disposed in surrounding relationship to the connector member and is of such a length that it overlaps the insulated portions of each of the cables. A dielectric material is disposed only between the opposite end portions of the sheath and the adjacent insulated portions of the associated cables, and the dielectric material and adjacent portions are subjected to vulcanization to thereby form a fluid-tight seal between the sheath and the insulated portions of the cables. In this manner, a simple, efficient fluid-tight connection is provided between the adjacent cable ends and at the same time provides an efficient electrical connection therebetween.

This invention is especially directed to a permanent splice for use with welding cables which are employed in large installations such as shipyards wherein the cable normally extends along the ground. In such a position, the cable is subjected to heavy abuse due to trucks and other vehicles passing thereover as well as falling objects which may strike the cable. It is apparent that under such circumstances, it is essential to provide a cable splice arrangement which provides maximum strength and rigidity to the splice in order to prevent premature failure thereof. In the present invention, a novel arrangement is provided for obtaining a maximum degree of strength and rigidity to the splice portion. The bared end portions of the cable fit snugly within the connector to provide a firm solid support for the connector throughout its length. The connector in turn abuts the adjacent end portions of the insulation surrounding the cables. The surrounding insulating sleeve of the sheath is provided with a bore of constant diameter substantially equal to the diameter of the cable insulation of the connector whereby the sleeve is supported throughout its length by the insulation and the connector member, the latter portions being substantially flush with one another as regards the outer diameters thereof. As a result, the only points at which there are any gaps whatsoever in the entire splice assembly are the relatively small areas where the connector is crimped to the bared cable ends, and accordingly the cable splice itself is provided with a maximum degree of strength and rigidity.

An object of the present invention is to provide a new and novel cable splice assembly for joining electrical cables which prevents electrical leakage from the splice and also prevents the entrance of moisture or other foreign material therein.

Another object is the provision of a cable splice assembly which provides good electrical contact.

A further object of the invention is to provide a cable splice assembly which is simple and inexpensive in construction, yet rugged and dependable in operation.

Still another object of the invention is to provide a cable splice assembly which is so constructed and arranged as to provide a maximum degree of strength and rigidity.

A further object is the provision of a method of quickly and easily providing a fluid-tight splice between a pair of cable ends.

Other objects and many of the attendant advantages of the invention will become more apparent when considered in connection with the following specification and drawings wherein.

Figure 1:
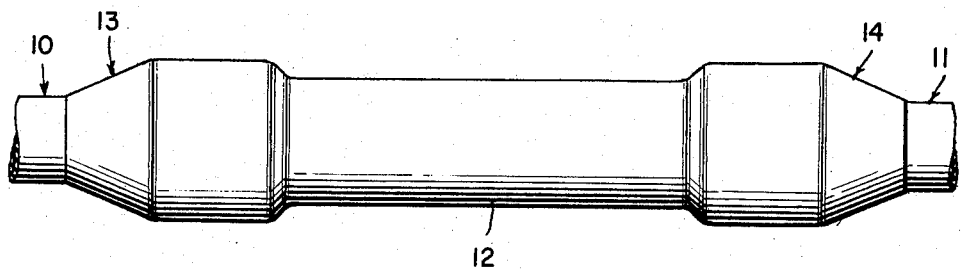
FIG. 1 is an elevation of a completed splice according to the present invention.

Referring now to the drawings wherein like reference characters designate corresponding parts throughout the several views, there is shown in FIG. 1, a pair of cable ends indicated generally by reference numerals 10 and 11 respectively and an insulating sheath 12 surrounding the terminal portions of the cables, the adjacent portions of the cable ends 10 and 11 and the opposite end portions of the insulating sheath being connected by sealing means 13 and 14 respectively.

Figure 2:
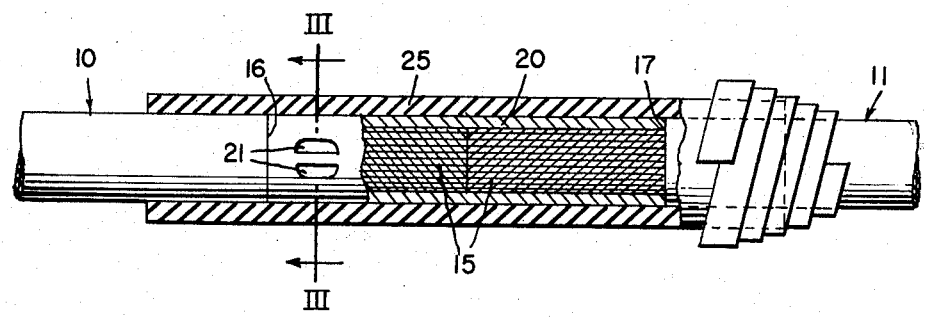
FIG. 2 is a view with certain parts broken away and in section to show the internal details thereof, and also showing the manner of application of dielectric material at one end of the insulating sheath.

Referring more particularly to FIG. 2, each of the cable ends comprises a metallic current conducting core 15 and the adjacent terminal portions of the cable ends are bared or, in other words, the insulation has been stripped from these ends. The insulation has been stripped back from each terminal end of the cable ends to a point where the insulation forms radially extending shoulders 16 and 17 extending completely around the inner cores of cable ends 10 and 11 respectively.

A tubular connector member 20 is formed of an easily deformable metal such as brass or the like, and the bared end portions of the cable ends are inserted in the opposite end portions of the connector member, the bared end portions and connector member being so proportioned that when shoulders 16 and 17 abut against opposite ends of the connector member, the terminal ends of the bared end portions are substantially in engagement with one another. It is desirable that the bared end portions be of such a length as to permit their insertion within the connector member up to a point where the shoulders 16 and 17 are both in abutting engagement with the connector member. The opposite end portions of the connector member are crimped (as shown for example at 21) by any suitable means (not shown) to provide a good physical and electrical connection between the connector member 20 and each of the bared cable ends.

The crimped portions 21 at opposite ends of connector member 20 are disposed at diametrically opposite portions of the connector member in order that it is not excessively distorted as would be the case if the crimped portions at opposite ends of the connector member were on the same side thereof.

Prior to securing the bared cable ends within the connector member 20, a sheath or sleeve 25 is slipped over one of the cables adjacent to the end to be joined to the other cable end, and after the two cable ends have been secured within the connector member, the insulation sheath is moved to the position shown in FIG. 2 of the drawings wherein it extends on both sides of the connector member. Since the insulating sheath is of greater length than the connector member 20, it overlaps adjacent insulated portions of the cable ends.

Figure 3:
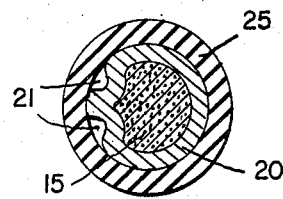
FIG. 3 is a view taken along line 3—3 of FIG. 2, looking in the direction of the arrows.

As clearly illustrated in FIGS. 2 and 3, the inner diameter of connector 20 is such that it snugly receives the metallic current conducting cores 15 of each of the cables. In addition, the outer diameter of the connector is substantially equal to that of the insulated portions of the cable members for presenting a substantially flush surface between the insulated portions of the cable members and the outer surface of the connector. The outer diameter of connector member 20 is substantially constant, and sleeve 25 is provided with a bore having a substantially constant diameter approximately equal to the outer diameter of the insulated portions of the cables and the connector 20. In this manner, the inner surface of sleeve 25 is in intimate contact with the outer surface of connector 20 and the outer surfaces of the adjacent portions of the cable insulation such that the sleeve is solidly supported at all points with the exception of the small areas where the crimped portions 21 are formed.

Each end of the insulating sheath is then sealed with respect to the adjacent insulated portion of the cable end by disposing a suitable dielectric material between the end of the sheath and the cable. The preferred method, as illustrated in the drawing, is to wrap a tape of suitable dielectric material, such as rubber or the like, about the end portion of the sleeve and the adjacent portion of the cable. The dielectric material is shown only as being applied to one end of the sleeve but it is apparent that the same procedure is followed at the opposite end thereof.

After application of the dielectric material at each end of the insulating sleeve, each dielectric seal and the adjacent portions are placed in a vulcanizer and vulcanized whereby the rubber tape applied to one end of the sleeve but it is apparent that the same procedure is followed at the opposite end thereof.

After application of the dielectric material at each end of the insulating sleeve, each dielectric seal and the adjacent portions are placed in a vulcanizer and vulcanized whereby the rubber tape and the adjacent portions of the insulating sleeve and the cable will be fused into a smooth finished configuration as shown in FIG. 1. Any conventional type of vulcanizer (not shown) may be employed for this operation. Prior to vulcanizing the joined parts, the insulation covering the cables is preferably roughened by a suitable tool to remove all wax from the surface thereof. In this manner, an efficient and reliable fluid-tight connection is provided between the cable ends.

It is apparent from the foregoing that there is provided a new and novel cable splice assembly for joining electrical cables wherein electrical leakage is prevented from the splice and the entrance of moisture or other foreign material into the splice is also prevented. The splice provides a good electrical connection between the cables, and is simple and inexpensive in construction, yet rugged and dependable in operation. A quick and easy method is provided for splicing a pair of cable ends together and providing a fluid-tight connection therebetween. In addition, it is evident that the cable splice according to the present invention is of such construction as to provide a maximum degree of strength and rigidity.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. A cable splice assembly which consists only of a pair of cable members having outer insulated portions and bared end portions, a hollow electrically conductive connector means, said end portions of the cable members abutting one another and being electrically connected to opposite end portions of said electrical connector means for electrically connecting said cables, an integral insulating sleeve surrounding said electrical connector means and overlapping and engaging the insulated portion of said cables at opposite ends of said connector means, and a body of sealing material associated only with the opposite end portions of said insulating sleeve, each sealing body completely surrounding and sealing the joint between the associated end portion of the insulating sleeve and the insulated portion of the cable, said body of insulating material being larger in diameter than said insulating sleeve and vulcanized only to the adjacent end portion of the insulating sleeve and to the adjacent insulating portion of the cable to provide a fluid-tight connection between the cable ends.

2. A cable splice assembly which consists only of a pair of cable members having outer insulated portions and bared end portions, a separate substantially cylindrical electrically conductive connector member, the bared end portions of the cable members extending within the opposite open ends of said connector member, the terminal ends of said bared end portions being in engagement with one another, said bared end portions being snugly received within said connector member thereby substantially filling the interior of said connector member, said connector member being crimped to said bared end portions adjacent the opposite end portions of said connector member, the opposite end portions of said connector member being disposed in abutting relationship with the insulated portions of the associated cable members, the outer diameter of said connector member being substantially equal to that of the insulated portions of the cable members for presenting a substantially flush surface between the insulated portions of the cable members and the outer surface of said connector member, and an insulating sleeve surrounding said electrical connector member and overlapping and engaging the insulated portions of said cables, said insulating sleeve having a bore formed longitudinally therethrough, said bore having a substantially constant diameter approximately equal to the outer diameter of the insulated portions of said cable members whereby the inner surface of said sleeve is in intimate contact with the outer surfaces of said insulated portions and said connector means throughout substantially the entire length thereof for providing a splice assembly of maximum strength, and sealing means engaged only with opposite end portions of said sleeve and the adjacent insulated portions of the cable members to effect a fluid-tight seal between said sleeve and the cable members, each of said sealing means comprising a body of insulating material vulcanized only to the adjacent portions of the insulating sleeve and the insulated portions of the cable.

References Cited in the file of this patent

UNITED STATES PATENTS

| | | |
|---|---|---|
| 1,272,700 | Newcomb | July 16, 1918 |
| 2,173,668 | Smith | Sept. 19, 1939 |
| 2,314,884 | Klein | Mar. 30, 1943 |
| 2,435,284 | Lodge | Feb. 3, 1948 |
| 2,478,082 | Broske | Aug. 2, 1949 |
| 2,674,647 | Dibner | Apr. 6, 1954 |

FOREIGN PATENTS

| | | |
|---|---|---|
| 1,158,890 | France | Feb. 3, 1958 |